(12) United States Patent
Lerner

(10) Patent No.: US 10,809,029 B1
(45) Date of Patent: Oct. 20, 2020

(54) HOLDER FOR WEAPON MAGAZINES

(71) Applicant: A.C.S (ADVANCED COMBAT SOLUTIONS) LTD, Or Yehuda (IL)

(72) Inventor: Meir Yair Lerner, Karmei Yosef (IL)

(73) Assignee: A.C.S (ADVANCED COMBAT SOLUTIONS) LTD, Or Yehuda (IL)

( * ) Notice: Subject to any disclaimer, the term of this patent is extended or adjusted under 35 U.S.C. 154(b) by 0 days.

(21) Appl. No.: 16/779,746

(22) Filed: Feb. 3, 2020

Related U.S. Application Data

(63) Continuation of application No. 16/413,802, filed on May 16, 2019.

(51) Int. Cl.
| | |
|---|---|
| *F42B 39/02* | (2006.01) |
| *F41A 17/38* | (2006.01) |
| *F16M 13/04* | (2006.01) |
| *F41A 9/64* | (2006.01) |
| *A45F 5/02* | (2006.01) |

(52) U.S. Cl.
CPC ............ *F41A 17/38* (2013.01); *F16M 13/04* (2013.01); *A45F 5/02* (2013.01); *A45F 2200/0591* (2013.01); *F41A 9/64* (2013.01)

(58) Field of Classification Search
CPC ............... F41A 9/68; F41A 9/63; F42B 39/02
USPC ...................... 42/90; 224/931, 245, 239, 674
See application file for complete search history.

(56) References Cited

U.S. PATENT DOCUMENTS

| | | | | |
|---|---|---|---|---|
| 1,756,677 A | * | 4/1930 | Cook | F42B 39/02 224/245 |
| 3,066,791 A | * | 12/1962 | Bivens | F42B 39/02 206/3 |
| 4,467,947 A | * | 8/1984 | Minneman | F42B 39/02 206/3 |
| 4,484,403 A | * | 11/1984 | Schwaller | B65D 21/0204 42/50 |
| 4,597,213 A | * | 7/1986 | Musgrave | F41C 27/00 42/90 |
| 4,799,323 A | * | 1/1989 | Musgrave | F41A 17/38 42/90 |
| 5,152,442 A | * | 10/1992 | Gallagher | A45F 5/02 206/3 |
| 6,202,908 B1 | * | 3/2001 | Groover | F42B 39/02 224/236 |
| 6,212,815 B1 | * | 4/2001 | Fitzpatrick | F41A 9/65 224/196 |

(Continued)

*Primary Examiner* — Michael D David
(74) *Attorney, Agent, or Firm* — Daniel J. Swirsky; AlphaPatent Associates Ltd.

(57) ABSTRACT

A magazine holder having a body for containing a magazine and having sidewalls and a base, a lever connected to a sidewall and having an external member located outside the body and an internal member coupled to the external member and located inside the body, a handle connected to the body and located outside the body and having a first state where the internal member secures the magazine to the body and a second state where the external member moves away from the sidewall for removing the magazine from the body, and a pusher extending from the handle towards the external member and placed between the external member and an external surface of the sidewall, where upon movement of the handle from the first state to the second state the pusher moves the external member farther from the sidewall.

9 Claims, 3 Drawing Sheets

(56) References Cited

U.S. PATENT DOCUMENTS

| | | | | |
|---|---|---|---|---|
| 6,481,136 | B1* | 11/2002 | Fitzpartick | F41A 9/65 42/18 |
| 6,698,129 | B1* | 3/2004 | Hanks | F41A 9/63 42/90 |
| 8,104,656 | B1* | 1/2012 | George | A45F 5/021 224/674 |
| 8,322,065 | B2* | 12/2012 | Faifer | F42B 39/02 206/3 |
| 8,887,972 | B2* | 11/2014 | Solomon | A45F 5/02 224/245 |
| 8,887,977 | B2* | 11/2014 | Ralph | F42B 39/02 224/245 |
| 9,097,489 | B2* | 8/2015 | Chiang | F42B 39/02 |
| 2004/0200111 | A1* | 10/2004 | Horn | A45F 5/021 42/50 |
| 2007/0278269 | A1* | 12/2007 | Rogers | F41A 9/65 224/239 |
| 2012/0174452 | A1* | 7/2012 | Anderson | F41A 9/65 42/49.01 |
| 2016/0003567 | A1* | 1/2016 | Purkiss | F41A 9/68 42/49.01 |

\* cited by examiner

HOLDER FOR WEAPON MAGAZINES

CROSS-REFERENCE TO RELATED APPLICATIONS

This application is a continuation of U.S. patent application Ser. No. 16/413,802, filed May 16, 2019, the contents of which are incorporated herein by reference.

FIELD

The present disclosure generally relates to a holder for weapon magazines.

BACKGROUND

Weapon magazines are used to contain bullets. The magazines are used for guns, rifles and in a variety of bullets' sizes and uses. As the magazine is not an integral part of the weapon, users of the weapons, such as soldiers, policemen and others, may hold the magazine in the garment's pocket or using a holder. The holder may be connected to the users' belt, jacket or other garments.

Commonly used magazine holders may be embedded in the warriors' vests. Such holders may be made of fabric such as cotton or polyester, or made of a rigid material such as metal or plastic. The fabric-based holders do not protect the magazine from physical damages, for example when the users fall down, the magazine can be damaged in a manner that prevents the user from using it. Rigid holders protect the magazine from environmental damages. However, these rigid holders secure the magazine in a manner that disables the user to smoothly remove the magazine when there is a need to immediately insert the magazine into the weapon.

SUMMARY

It is an object of the subject matter to disclose a magazine holder, comprising a body, configured to contain the magazine, a handle connected to the body and a lever connected to the body, said lever comprises an external member located outside the body, coupled to the handle and located outside the body and an internal member coupled to the external member and located inside the body. The handle has a first state in which the internal member secures the magazine to the body and a second state in which the internal member enables removal of the magazine from the body.

In some cases, the magazine holder further comprises a handle spring connected to the handle, the handle spring is configured to retract the handle from the second state to the first state.

In some cases, the handle comprises a pusher extending towards the lever, said pusher is configured to be placed between the external member and the body, thereby moving the external member away from the body.

In some cases, the magazine holder further comprises a connector connected to the body, said connector is configured to connect the magazine holder to another item.

In some cases, the handle moves towards the body when moving from the first state to the second state. In some cases, the internal member and the external member are connected via an aperture in a sidewall of the body.

In some cases, the internal member is placed in a height that matches a hole in the magazine. In some cases, the body comprises a base and sidewalls, wherein the holder further comprises a body spring connected to the body, said spring is tensed when the magazine is inserted into the body and pushes the magazine away from the base when the handle is in the second state.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The present invention discloses a rigid magazine holder configured to enable easy removal or the magazine while protecting the magazine from being hit. The magazine holder comprises a body, configured to contain the magazine. The size and shape of the body may be configured to hold the magazine in a firm manner, without the magazine moving inside the body. In some exemplary embodiments, at least a portion of the body is made of rigid material. The magazine holder may be configured to be secured to a user's vest or other garment, such as a belt. The magazine holder comprises a connector coupled to the body, said connector is physically connected to the garment or vest. The connector may be stitched or connected to the vest or garment using adhesive material, bolts, hooks and loops or any other securing or connecting mechanism desired by a person skilled in the art.

Figure 1:
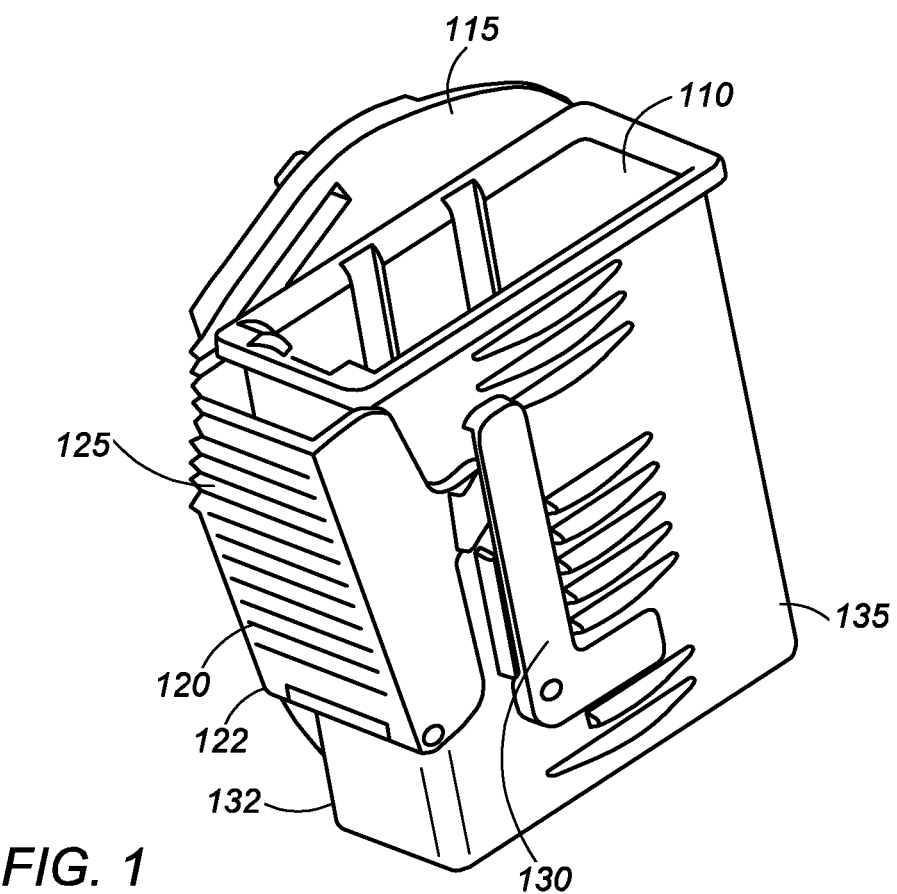
FIG. 1 discloses a magazine holder, according to exemplary embodiments of the subject matter.

The magazine holder also comprises a handle configured to remove the magazine from the body. The handle has a first state, in which the magazine is secured to the body, and a second state, in which the magazine can be removed from the body. When a user of the magazine holder presses the handle, the user enables removal of the magazine from the holder's body. In some exemplary cases, the magazine holder also comprises a body spring configured to push the magazine away from the body, when or after the handle is in the second state. This way, the magazine is smoothly, quickly and easily removed from the magazine holder. The user can remove the magazine using a single hand, FIG. 1 discloses a magazine holder, according to exemplary embodiments of the subject matter. The magazine holder comprises a body, configured to contain the magazine. The body comprises sidewalls 132 and a base. The upper side of the sidewalls 132 ends with lips 110 via which the magazine is inserted into the body. The body has an inner volume defined between the sidewalls. The size and shape of the inner volume enable the user to easily insert the magazine, without the magazine moving inside the inner volume. In some cases, the body comprises only sidewalls 132, configured to hold the magazine inside the body. In some exemplary embodiments, the body comprises the sidewalls 132 and the base is assembled by a spring connected to the bottom section of the sidewalls 132, preventing the magazine from falling downwards. The body may be made of plastics, polymers, metal and a combination thereof.

The magazine holder also comprises a handle 120 coupled to the body. The holder may be pressed by the user towards the body using a single hand, for example as the fingers grasp the body and the user's wrist pushes the handle 120 towards the body. In some exemplary cases, the handle 120 is physically connected to two sidewalls in a bottom portion 122 of the handle 120, enable the upper portion 125 of the handle 120 to move when the user presses the handle 120.

The magazine holder also comprises a lever 130. The lever 130 is secured to a lever sidewall 135 of the body. In some exemplary cases, the body has four (4) sidewalls, and the lever 130 is secured to a lever sidewall 135 which is located next to the sidewall 132 to which the handle 120 is located. The lever 130 has an external member located outside the body and an internal member located inside the body. The external member and the internal member are connected to each other. In some exemplary cases, the external member and the internal member are connected via an aperture in the lever sidewall 135. The external member and the internal member can be connected to each other in additional manner, as desired by a person skilled in the art. The internal member of the lever 130 may be placed in the inner volume of the body, in a height and depth that fit a hole in the magazine's body.

When the user of the magazine holder presses the handle 120 towards the sidewall 132, the lever 130 moves away from the lever sidewall, thereby enabling removal of the magazine from the body. The lever 130 may be secured to a lever spring (not shown) configured to retract the lever to the first state after the magazine is removed from the holder.

The magazine holder also comprises a connector 115 configured to connect the magazine holder to another item. The connector 115 is physically coupled to the body, for example using screws secured to one of the sidewalls, as elaborated below. The connector 115 may comprise arms or another mechanism configured to grasp the item to which the magazine holder is secured. The other item may be a vest or garment.

Figure 2:
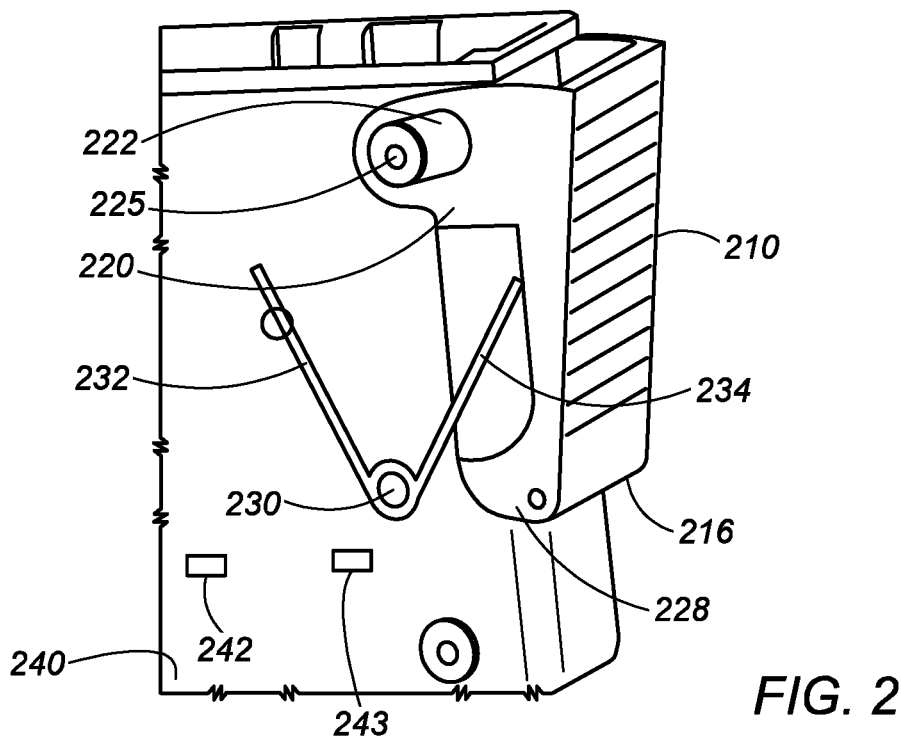
FIG. 2 discloses a magazine holder with a handle spring configured to retract the handle, according to exemplary embodiments of the subject matter.

FIG. 2 discloses a magazine holder with a handle spring configured to retract the handle, according to exemplary embodiments of the subject matter. The handle comprises a rear side 210 and one or more lateral sides 220. In the embodiment shown in FIG. 2, the handle has two lateral sides secured to two sidewalls. The lateral side 220 extends forward from the rear side 210, and is secured to lateral sidewall 240. The lateral sidewall 240 has a protrusion member 225 extending outwards from an external surface of the lateral sidewall 240. Front upper portion of the lateral side 220 has a niche 222 that limit the movement of the lateral side 220 around the protrusion member 225.

In some exemplary cases, the lateral side 220 of the handle is coupled to a retracting mechanism, such as a handle spring 230. The handle spring 230 may be physically secured to the lateral sidewall 240, or to another part of the holder's body. The handle spring 230 may comprise two arms connected via a hinge, first arm 232 is secured to the lateral sidewall and second arm 234 secured to the lateral side 220. When the user moves the lateral side 220 towards the body, the second arm 234 moves towards the first arm 232 and the handle spring 230 is tensed. When the user releases the handle, the handle spring 230 retracts the handle away from the body. The lateral sidewall 240 also shows connector protrusions 242, 243 configured to secure the connector to the holder's body, via the lateral sidewall 240.

The bottom portion 228 of the lateral side 220 is secured to the body of the magazine holder, for example via a rotating axis 216. The rotating axis 216 enables rotational movement of the handle relative to the holder's body. The rotational movement may be limited by the side of the niche 222 secured to the protrusion member 225.

Figure 3:
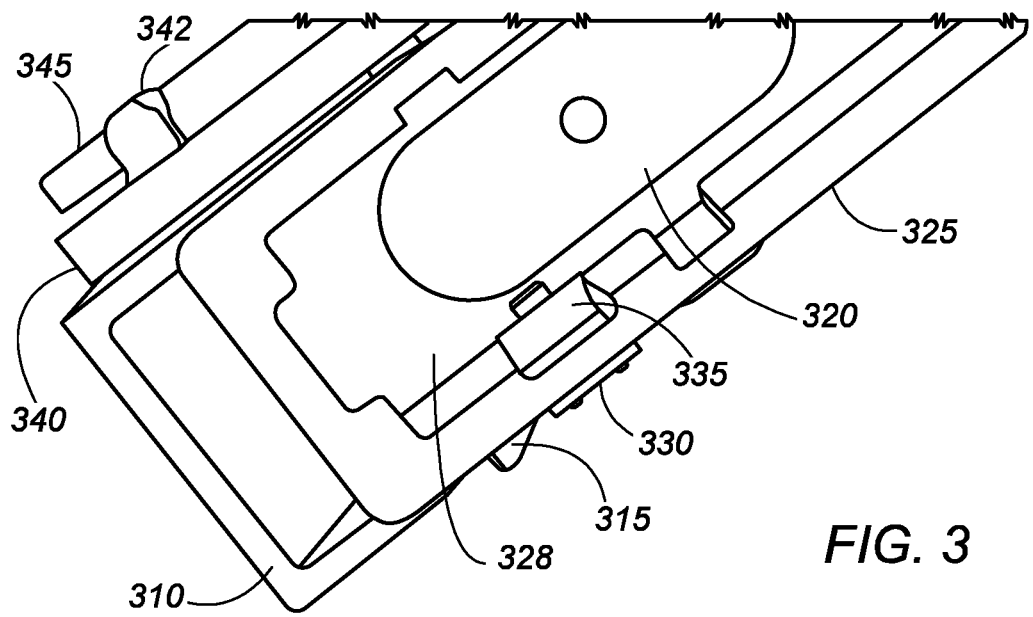
FIG. 3 discloses a top view of a magazine holder securing the magazine, according to exemplary embodiments of the subject matter.

FIG. 3 discloses a top view of a magazine holder securing the magazine, according to exemplary embodiments of the subject matter. The top view shows a top surface of the handle 310. The handle extends forward towards the lever. The forward side of the handle is a pusher 315 configured to push the lever in a manner that releases the magazine. In some exemplary cases, the pusher 315 pushes the external member 330 of the lever away from the lever sidewall 325. In FIG. 3, the handle 310 is in the first state, and the magazine is secured to the body using an internal member 335 of the lever. In some exemplary cases, the internal member 335 is placed in a height that matches a niche of the magazine. The internal member 335 is configured to secure the magazine to the inner volume of the holder's body. In some other cases, the internal member 335 may be placed above the magazine, towards the lips of the sidewalls, thus preventing the magazine from being released upwards. When the lever is in the first state, the internal member 335 may protrude at about 3-7 millimeters from the internal surface 328 of the lever sidewall 325. When the lever is in the second state, the internal member 335 may protrude at about 0-2 millimeters from the internal surface 328 of the lever sidewall 325, enabling removal of the magazine.

The top view of the magazine holder also shows a base 320 of the holder. The base 320 is secured to all the sidewalls. In some exemplary cases, the holder has sidewalls and lacks the base 320. The inner volume of the body, defined between the four sidewalls, matches the shape and size of the magazine, thereby preventing the magazine from moving inside the body when secured therein.

The top view also shows a connector 340 configured to enable connecting the magazine holder to another item, such as a vest 345. The connector 340 may be secured to the sidewall via screws, adhesive material or using another mechanism. The connector 340 may comprise one or more arms 342 configured to secure the connector 340 to the vest 345.

Figure 4:
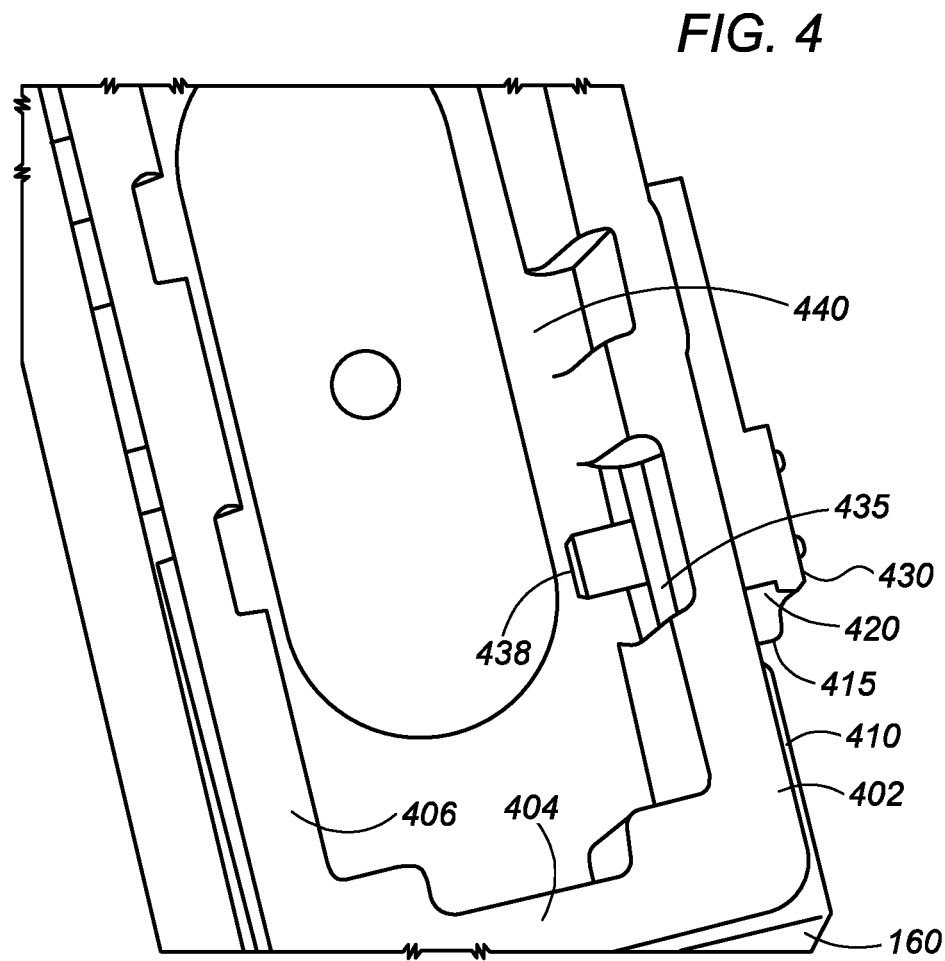
FIG. 4 discloses a top view of a magazine holder enabling release of the magazine, according to exemplary embodiments of the subject matter; and, FIG. 5 discloses a cross section view of a magazine holder having a body spring, according to exemplary embodiments of the subject matter.

FIG. 4 discloses a top view of a magazine holder enabling release of the magazine, according to exemplary embodiments of the subject matter. The holder's body comprises a base 440 and sidewalls 402, 404 and 406. The rear side 460 of the handle is close to the handle sidewall 404, and the front sides 410 of the handle are secured to the sidewalls 402 and 406. The front side 410 of the handle comprises a pusher 415 which is a front end of the front side, engaging with the external member 430 of the lever. When the handle is in the first state, the external member 430 is distanced from the external surface of the sidewall 402 in a manner that enables the pusher 415 to be inserted between the external surface of the sidewall 402 and the external member 430. When the user presses the handle, the pusher moves forward, moving the external member farther from the sidewall 402. As the external member 430 is statically secured to the internal member 435 of the lever, the internal member 435 also moves outwards from the inner volume of the body when the user presses the handle, enabling removal of the magazine. The internal member 435 may partially remain inside the inner volume of the body, for example at about 0.5-2 millimeters, in a manner that enables smooth removal of the magazine. Pin 438 protrudes into the inner volume of the body after the magazine is removed therefrom.

Figure 5:
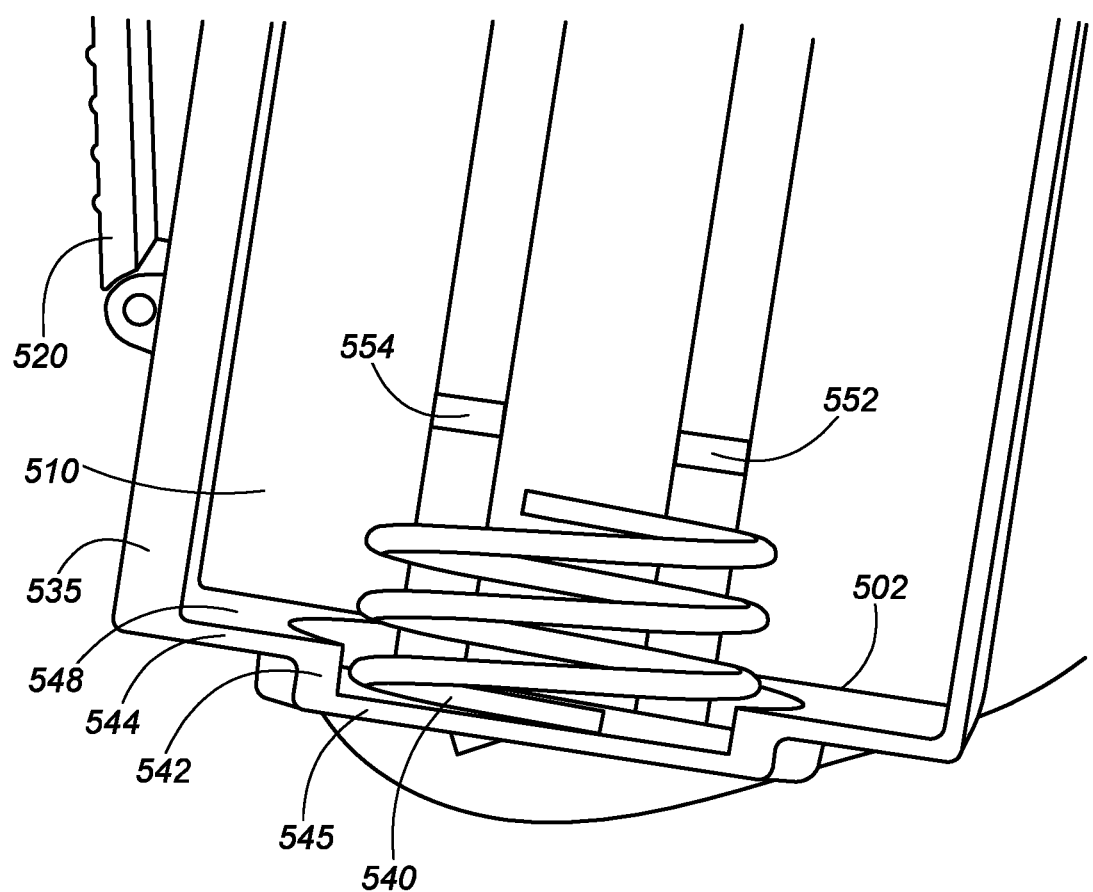

FIG. 5 discloses a cross section view of a magazine holder having a body spring, according to exemplary embodiments of the subject matter. The magazine holder comprises a handle 520 and a body 510 comprises sidewalls and a base 545. The holder comprises a body spring 540 configured to push the magazine upwards, towards the body lips, when at least a portion of the internal member is moved outside of the holder's body. The base 545 and the sidewalls form a niche 548 configured to secure the body spring 540 inside the body, also when there is no magazine in the magazine holder. The niche 548 may be formed when the base 545 has a smaller area than the upward lips of the body. This way, a step 542 is formed upwards from the base 545. Niche bottom 544 extends laterally from the step 542 towards the sidewalls 535. Niche top 502 is also secured to the sidewalls 535, forming the niche 548 in which the body spring 540 is tensed. When the body spring 540 extends, a bottom side of the body spring 540 remains in the niche 548. Connecting members 552 and 554 are configured to protrude into the inner side of the body 510, securing the connector to the body 510.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A magazine holder, comprising:
   a body configured to contain a magazine, said body comprising sidewalls and a base;
   a lever connected to a lever sidewall of the body, said lever comprises an external member located outside the body and an internal member coupled to the external member and located inside the body;
   a handle connected to the body, said handle is located outside the body, wherein the handle has a first state in which the internal member secures the magazine to the body and a second state in which the external member moves away from the lever sidewall, thereby enabling removal of the magazine from the body; and
   a pusher extending from the handle towards the external member of the lever; said pusher is placed between the external member and an external surface of the lever sidewall, wherein the pusher is in physical contact with the external member of the lever when the handle is in the first state and in the second state, wherein upon movement of the handle from the first state to the second state, the pusher moves the external member of the lever farther from the lever sidewall.

2. The magazine holder according to claim 1, further comprising a handle spring connected to the handle, the handle spring is tensed when the handle is in the second state, wherein the handle spring is configured to retract the handle from the second state to the first state.

3. The magazine holder according to claim 1, further comprising a connector connected to the body, said connector is configured to connect the magazine holder to another item.

4. The magazine holder according to claim 1, wherein the handle moves towards the body when moving from the first state to the second state.

5. The magazine holder according to claim 1, wherein the internal member and the external member are connected via an aperture in the lever sidewall.

6. The magazine holder according to claim 1, further comprising a body spring connected to the body, said body spring is tensed when the magazine is inserted into the body and pushes the magazine away from the base when the handle is in the second state.

7. The magazine holder according to claim 1, wherein the handle comprises a rear side and one or more lateral sides, said one or more lateral sides extend forward from the rear side and are secured to a lateral sidewall of the body.

8. The magazine holder according to claim 7, wherein the lateral sidewall has a protrusion member extending outwards from an external surface of the lateral sidewall, wherein a front upper portion of each of the lateral sides has a niche that limits a movement of the lateral sides around the protrusion member when the handle moves from the first state to the second state.

9. The magazine holder according to claim 7, wherein the lateral sidewall has a bottom portion, said bottom portion is secured to the body of the magazine holder, via a rotating axis, said rotating axis enables rotational movement of the handle relative to the body.

\* \* \* \* \*